(12) United States Patent
Sato et al.

(10) Patent No.: US 10,072,131 B2
(45) Date of Patent: Sep. 11, 2018

(54) RUBBER COMPOSITION FOR TIRE

(71) Applicant: THE YOKOHAMA RUBBER CO., LTD., Minato-Ku, Tokyo (JP)

(72) Inventors: Masaki Sato, Hiratsuka (JP); Satoshi Mihara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/315,839

(22) PCT Filed: Jun. 4, 2015

(86) PCT No.: PCT/JP2015/066171
§ 371 (c)(1),
(2) Date: Dec. 2, 2016

(87) PCT Pub. No.: WO2015/186781
PCT Pub. Date: Dec. 10, 2015

(65) Prior Publication Data
US 2017/0121494 A1    May 4, 2017

(30) Foreign Application Priority Data

Jun. 4, 2014 (JP) ................. 2014-115540

(51) Int. Cl.
*C08K 3/36* (2006.01)
*B60C 1/00* (2006.01)
*C08K 5/548* (2006.01)

(52) U.S. Cl.
CPC .............. *C08K 3/36* (2013.01); *B60C 1/0016* (2013.01); *C08K 5/548* (2013.01)

(58) Field of Classification Search
CPC .......... C08K 3/36; C08K 5/548; B60C 1/0016
USPC ....................................................... 524/492
See application file for complete search history.

(56) References Cited

U.S. PATENT DOCUMENTS

| 8,669,321 B2 | 3/2014 | Hattori et al. |
| 9,493,638 B2 | 11/2016 | Sugiura et al. |
| 2012/0016056 A1 | 1/2012 | Miyazaki |
| 2015/0126643 A1* | 5/2015 | Satou ................ B60C 1/00 523/156 |

FOREIGN PATENT DOCUMENTS

| JP | 2011-057922 A | 3/2011 |
| JP | 2011-140628 A | 7/2011 |
| JP | 2011-144265 A | 7/2011 |
| JP | 2012-036370 A | 2/2012 |
| JP | 2012-121936 A | 6/2012 |
| JP | 2012-201824 A | 10/2012 |
| JP | 2013-100426 A | 5/2013 |
| JP | 2013-185092 A | 9/2013 |
| JP | 2013-213179 A | 10/2013 |
| JP | 2014-031476 A | 2/2014 |
| WO | WO 2013133432 A1 * | 9/2013 ............... B60C 1/00 |

OTHER PUBLICATIONS

Mihara, Saroshi, Reactive Processing of Silica-reinforced Tire Rubber: New insight into the time-and temperature-dependence of silica-rubber interaction, Concept Thesis, Dec. 2008, Department of Elastomer Technology and Engineering, University of Twente, Enschede, Netherlands.

* cited by examiner

*Primary Examiner* — Angela C Scott
(74) *Attorney, Agent, or Firm* — Carrier Blackman & Associates, P.C.; Joseph P. Carrier; Anne G. Sabourin

(57) ABSTRACT

The present invention provides a rubber composition a tire, by which both low rolling resistance and wet grip performance can be achieved at high levels. This rubber composition for a tire is obtained by blending from 66 to 180 parts by weight of a silica having a nitrogen adsorption specific surface area of from 150 to 400 $m^2/g$ into 100 parts by weight of a diene rubber; a size $R_{ss}$ of aggregates of the silica forming a hierarchical structure being from 14 to 23 nm when the rubber composition is measured by ultra-small-angle X-ray scattering and an obtained scattering profile is applied to a Unified-Guinier function.

3 Claims, 1 Drawing Sheet

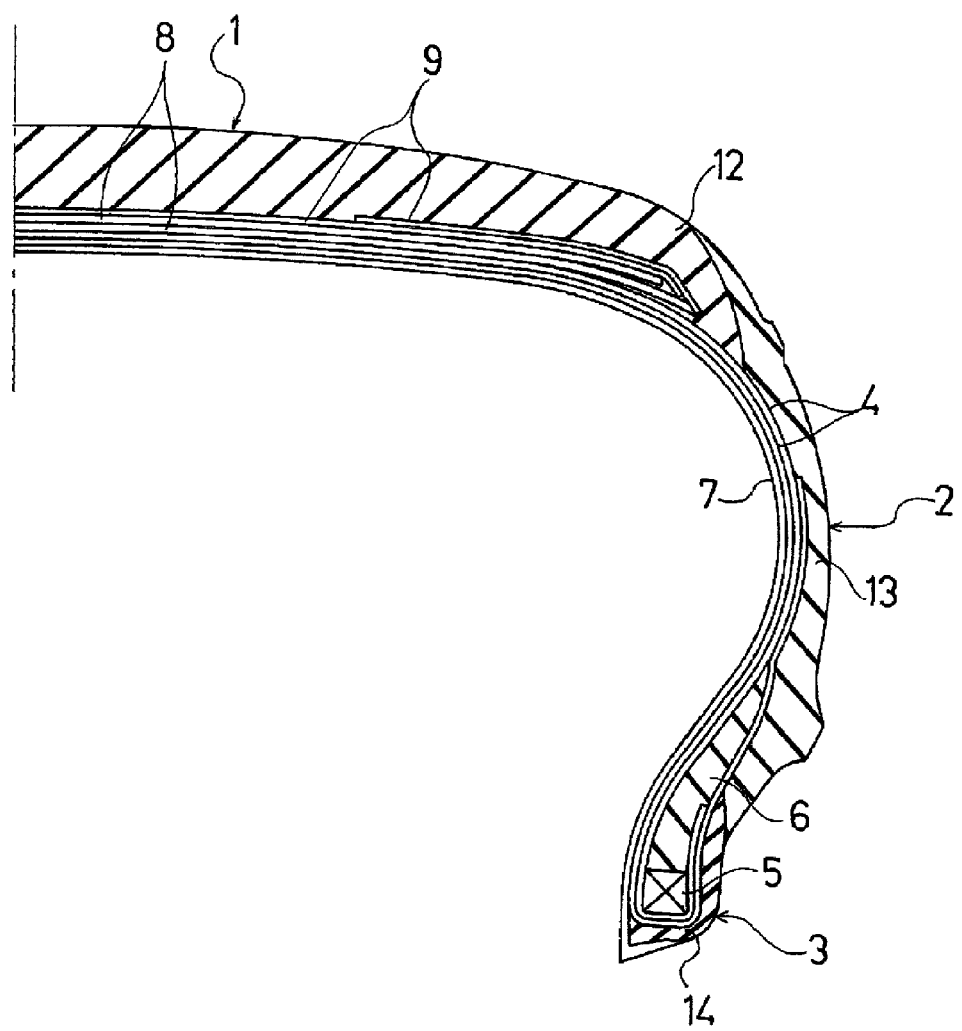

RUBBER COMPOSITION FOR TIRE

TECHNICAL FIELD

The present invention relates to a rubber composition for a tire, by which both low rolling resistance and wet grip performance can be achieved at high levels.

BACKGROUND ART

There is a demand to reduce the rolling resistance of pneumatic tires in order to enhance the fuel economy performance of vehicles. In addition, simultaneously achieving excellent wet grip performance is necessary for the pneumatic tires. Silica is typically blended into a rubber composition for a tire in order to enhance low rolling resistance and wet grip performance. In this case, the compounded amount of silica should be increased to enhance the wet grip performance of the rubber composition. However, when the amount of silica is increased, there has been a problem in that the dispersibility of the silica is deteriorated to increase the rolling resistance. That is, with a rubber composition having a large compounded amount of silica, it has been difficult to achieve both low rolling resistance and wet grip performance.

On the other hand, tan δ at 60° C. of a rubber composition is often used as an indicator of rolling resistance. However, tan δ is a ratio of the storage elastic modulus, which is the component of the energy generated in a substance due to external force and strain that is stored inside the substance, and the loss elastic modulus, which is the component diffused to the outside, and tan δ does not essentially explain the factors that influence the magnitudes of these components. In recent years, ultra-small-angle X-ray scattering (USAXS) has been proposed as a technique for investigating the hierarchical structure of a rubber composition containing silica (primary particles, aggregates, agglomerates) (for example, see Non-Patent Document 1). However, the relationship between the hierarchical structure of the rubber composition containing silica and the rolling resistance and wet grip performance thereof has not yet been elucidated.

CITATION LIST

Non-Patent Literature

Non-Patent Document 1: S. Mihara, in Thesis: Reactive processing of silica filled tire rubber. 2008, Dept. of Elastomer Technol. And Eng., Uviv. Twente (the Netherlands)

SUMMARY OF INVENTION

Technical Problem

An object of the present invention is to provide a rubber composition for a tire, by which low rolling resistance and wet grip performance can be enhanced to or beyond conventional levels.

Solution to Problem

The rubber composition for a tire of the present invention which achieves the object described above is a rubber composition obtained by blending from 66 to 180 parts by weight of a silica having a nitrogen adsorption specific surface area of from 150 to 400 m²/g into 100 parts by weight of a diene rubber; a size $R_{ss}$ of aggregates of the silica forming a hierarchical structure being from 14 to 23 nm when the rubber composition is measured by ultra-small-angle X-ray scattering and an obtained scattering profile is applied to a Unified-Guinier function.

Advantageous Effects of Invention

The relationship between the compounded amount of silica and the hierarchical structure thereof is specified in the rubber composition for a tire of the present invention by blending a silica having a nitrogen adsorption specific surface area of from 150 to 400 m²/g in a large amount of from 66 to 180 parts by weight into 100 parts by weight of a diene rubber while setting the size $R_{ss}$ of aggregates forming a hierarchical structure estimated from the measurement results of ultra-small-angle X-ray scattering to 14 to 23 nm. Therefore, it is possible to achieve a balance of low rolling resistance and wet grip performance at a higher level than conventional levels.

Mercaptosilane may be blended into the rubber composition for a tire in an amount of from 1 to 25 wt. % of the silica weight.

In addition, the rubber composition preferably contains at least 20 wt. % of a modified diene rubber having a functional group having at least one type of atom selected from the group of atoms consisting of a nitrogen atom, an oxygen atom, and a silicon atom relative to 100% of the diene rubber, which makes it easy to adjust the size $R_{ss}$ of aggregates forming a hierarchical structure to 14 to 23 nm. The functional group may be selected from a hydroxy group, an alkoxysilyl group, a silicon-containing group having siloxane bonds, an aminosilyl group, an epoxy group, and an amino group.

BRIEF DESCRIPTION OF DRAWING

FIG. 1 is a partial cross-sectional view in a tire meridian direction illustrating an example of an embodiment of a pneumatic tire in which a rubber composition for a tire tread of the present invention is used.

DESCRIPTION OF EMBODIMENT

FIG. 1 illustrates an example of an embodiment of a pneumatic tire in which a rubber composition for a tire tread is used. The pneumatic tire includes a tread portion 1, sidewall portions 2, and bead portions 3.

In FIG. 1, in a pneumatic tire, two carcass layers 4 are disposed extending between the left and right side bead portions 3. Each carcass layer 4 is formed by arranging and embedding reinforcing cords, which extend in a tire radial direction, in a rubber layer at a predetermined pitch in a tire circumferential direction. Each end portion of the carcass layers 4 folds back around a bead core 5 embedded in the bead portion 3 from the inside to the outside in a tire axial direction to sandwich a bead filler 6. An inner liner layer 7 is disposed inward of the carcass layer 4. Two belt layers 8 are disposed on an outer circumferential side of the carcass layer 4 of the tread portion 1. Each belt layer 8 is formed by arranging and embedding reinforcing cords, which extend inclined in the tire circumferential direction, in a rubber layer at a predetermined pitch in the tire axial direction. The inclination directions of the reinforcing cords of the two belt layers 8 intersect so as to be opposite each other in the tire circumferential direction. A belt cover layer 9 is disposed on an outer circumferential side of the belt layers 8. The tread portion 1 is formed from a tread rubber layer 12 on an outer circumferential side of the belt cover layer 9. The tread rubber layer 12 is preferably composed of the rubber composition for a tire tread of the present application. A side rubber layer 13 is disposed outward of the carcass layers 4 in each side wall portion 2, and a rim cushion rubber layer 14 is provided outward of the portion of each carcass layer 4 that is folded back around the bead portion 3. It should be noted that a studless tire is not limited to the embodiment of the pneumatic tire illustrated in FIG. 1 as an example.

The rubber composition for a tire of the present invention is obtain by blending silica having a nitrogen adsorption specific surface area of from 150 to 400 m$^2$/g into a diene rubber. By blending silica, it is possible to improve the low rolling resistance and wet grip performance of the rubber composition for a tire.

The nitrogen adsorption specific surface area of the silica is from 150 to 400 m$^2$/g, preferably from 155 to 330 m$^2$/g, and more preferably from 185 to 270 m$^2$/g. When the nitrogen adsorption specific surface area of the silica is less than 150 m$^2$/g, the wet grip performance of the rubber composition for a tire cannot be sufficiently enhanced. In addition, when the nitrogen adsorption specific surface area of the silica exceeds 400 m$^2$/g, it becomes difficult to set the size $R_{ss}$ of aggregates forming a hierarchical structure to not more than 23 nm, and the rolling resistance is deteriorated. In the present application, the nitrogen adsorption specific surface area of the silica is a value measured in accordance with ISO 9277.

The compounded amount of the silica is from 66 to 180 parts by weight, and preferably from 75 to 150 parts by weight, per 100 parts by weight of the diene rubber. When the compounded amount of the silica is less than 66 parts by weight, the rolling resistance and wet grip performance of the rubber composition cannot be sufficiently made small. When the compounded amount of the silica exceeds 180 parts by weight, it becomes difficult to set the size $R_{ss}$ of aggregates forming a hierarchical structure to not more than 23 nm.

The rubber composition for a tire of the present invention is characterized in that the size of aggregates of the silica dispersed in the diene rubber is from 14 to 23 nm in terms of the size $R_{ss}$ of aggregates forming a hierarchical structure estimated by quantitative analysis based on a Unified-Guinier function of a scattering profile obtained by ultra-small-angle X-ray scattering (USAXS) measurement.

The Unified-Guinier function is expressed by the following general formula (I).

[Formula 1]

$$I(q) = A\exp\left(-\frac{q^2 R_{gg}^2}{3}\right) q^{-p} + B\exp\left(-\frac{q^2 R_{gg}^2}{3}\right) + \\ C\exp\left(-\frac{q^2 R_{ss}^2}{3}\right) \times \left[\text{erf}\left(\frac{qR_{gg}}{\sqrt{6}}\right)\right]^{3D_m} q^{-D_m} + \\ D\exp\left(-\frac{q^2 R_{ss}^2}{3}\right) + E\left[\text{erf}\left(\frac{qR_{ss}}{\sqrt{6}}\right)\right]^{3(2d-D_s)} q^{-(2d-D_s)} \quad (I)$$

In general formula (I) above, q is the wave number; I(q) is the scattering intensity for a wave number q; A, B, C, D, and E are constants; p is a power exponent; $R_{ss}$ is the size of aggregates forming a hierarchical structure; $R_{gg}$ is the size of higher-order aggregates; Dm is the mass fractal dimension; Ds is the surface fractal dimension; and d is the Euclidean dimension of space.

The measurement result of ultra-small-angle X-ray scattering (USAXS) is obtained as a scattering profile with the wave number q on the horizontal axis and the scattering intensity I(q) on the vertical axis. By fitting this scattering profile so as to apply general formula (I) above, the constants A, B, C, D, and E, the exponent p, the mass fractal dimension Dm, the surface fractal dimension Ds, and the size $R_{ss}$ of aggregates forming a hierarchical structure are estimated. Note that the Euclidean dimension d is 3. In addition, the size $R_{gg}$ of higher-order aggregates is considered to be infinite since the aggregates are not observed in the range of the wave number q of the present specification Therefore, first and second terms of general formula (I) above can be ignored.

The measurement conditions of ultra-small-angle X-ray scattering (USAXS) are such that measurements are performed with a wave number q of from 0.006 to 0.4 nm$^{-1}$ (q=4π(λ sin θ; θ: scattering angle; λ: 0.62 Angstrom (X-ray energy: 20 keV); exposure time: 488 msec; camera length: 7.6 m). $R_{ss}$ can be calculated by finding the circular average of −90 to 180° to transform the resulting scattering image into a single dimension and performing fitting using general formula (I) above for the scattering profile. Note that a vulcanized rubber sheet having a thickness of 0.5 mm is used as a rubber composition sample, and measurements are performed at 100° C.

In the present invention, the size $R_{ss}$ of aggregates forming a hierarchical structure is from 14 to 23 nm, and preferably from 15 to 22 nm. When the size $R_{ss}$ of aggregates forming a hierarchical structure exceeds 23 nm, it is not possible to enhance the balance between the low rolling resistance and the wet grip performance to or beyond conventional levels.

When the amount of the silica blended into the rubber composition is increased, the wet grip performance can be enhanced. However, conventionally, when the amount of the silica is increased, the dispersibility of the silica is deteriorated to increase the rolling resistance. That is, even when the compounded amount of the silica is made large, it has been difficult to achieve both wet grip performance and low rolling resistance. Here, the loss tangent tan δ (60° C.) of the rubber composition is known as an indicator of rolling resistance. However, the loss tangent tan δ does not essentially explain the mechanism of energy loss in the rubber composition. That is, tan δ is a ratio of the storage elastic modulus, which is the component of the energy generated in a substance due to external force and strain that is stored inside the substance, and the loss elastic modulus, which is the component diffused to the outside, and tan δ does not essentially explain the factors that influence the magnitudes of these components.

The present inventors discovered that the hierarchical structure of silica is related to the nature of energy loss, and the present inventors thereby completed the present invention. That is, by making the size $R_{ss}$ of aggregates of silica forming a hierarchical structure small in the hierarchical structure of a rubber composition containing silica, it is possible to make the energy loss small and to reduce heat buildup. This makes it possible to reduce the rolling resistance when the rubber composition is formed into a pneumatic tire. Accordingly, even in the case of a rubber composition having a large compounded amount of silica, the rolling resistance can be reduced so as to achieve both low rolling resistance and wet grip performance by making the size $R_{ss}$ of aggregates of silica forming a hierarchical structure small in the range of from 14 to 23 nm.

In the rubber composition for a tire of the present invention, it becomes easy to adjust the size $R_{ss}$ of aggregates forming a hierarchical structure to 14 to 23 nm by blending a mercaptosilane. The compounded amount of the mercaptosilane is preferably from 1 to 25 wt. %, and more preferably from 3 to 20 wt. % of the silica weight. When the compounded amount of the mercaptosilane is less than 1 wt. %, there is a risk that the size $R_{ss}$ of aggregates forming a hierarchical structure cannot be easily adjusted to 14 to 23 nm. When the compounded amount of the mercaptosilane exceeds 25 wt. %, the rubber composition tends to cause early vulcanization, which leads to a risk that the moldability may be deteriorated.

The mercaptosilane is preferably a mercaptosilane compound represented by general formula (2) below, or a copolymer having structures of general formulas (3) and (4) below, or a polysiloxane having an average composition formula represented by general formula (5) below, which can enhance affinity with silica and improve the dispersibility thereof. Of these, a mercaptosilane represented by formula (5) is preferable. These mercaptosilane compounds may be blended alone, or a plurality of compounds may be blended in combination.

[Chemical Formula 1]

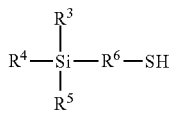

(2)

(In the formula, $R^3$, $R^4$, and $R^5$ are each independently selected from hydrogen, alkyl groups having from 1 to 8 carbon atoms, alkoxy groups having from 1 to 8 carbon atoms, linear polyether groups having a chain length of from 4 to 30, and aryl groups having from 6 to 30 carbon atoms; at least one is the alkoxy group and at least one is the linear polyether group; and $R^6$ is an alkylene group having from 1 to 30 carbon atoms.)

[Chemical Formula 2]

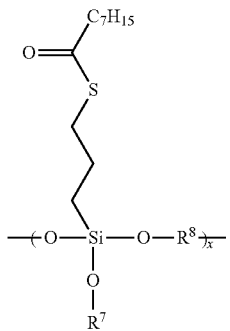

(3)

(In the formula, $R^7$ and $R^8$ may form a ring structure; $R^7$ is selected from hydrogen, halogen, alkyl groups or alkylene groups having from 1 to 30 carbon atoms, alkenyl groups or alkenylene groups having from 2 to 30 carbon atoms, alkynyl groups or alkynylene groups having from 2 to 30 carbon atoms, and groups in which a terminal of the above alkyl groups or alkenyl groups is substituted with a hydroxyl group or a carboxyl group; $R^8$ is selected from alkylene groups having from 1 to 30 carbon atoms, alkenylene groups having from 2 to 30 carbon atoms, and alkynylene groups having from 2 to 30 carbon atoms; and x is an integer of 1 or greater.)

[Chemical Formula 3]

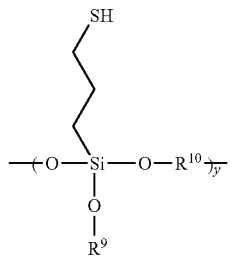

(4)

(In the formula, $R^9$ and $R^{19}$ may form a ring structure; $R^9$ is selected from hydrogen, halogen, alkyl groups or alkylene groups having from 1 to 30 carbon atoms, alkenyl groups or alkenylene groups having from 2 to 30 carbon atoms, alkynyl groups or alkynylene groups having from 2 to 30 carbon atoms, and groups in which a terminal of the above alkyl groups or alkenyl groups is substituted with a hydroxyl group or a carboxyl group; $R^{19}$ is selected from alkylene groups having from 1 to 30 carbon atoms, alkenylene groups having from 2 to 30 carbon atoms, and alkynylene groups having from 2 to 30 carbon atoms; and y is an integer of 1 or greater.)

[Chemical Formula 4]

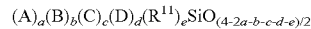

(5)

(In the formula, A is a bivalent organic group containing a sulfide group; B is a monovalent hydrocarbon group having from 5 to 10 carbon atoms; C is a hydrolyzable group; D is an organic group containing a mercapto group; $R^{11}$ is a monovalent hydrocarbon group having from 1 to 4 carbon atoms; and a to e satisfy the relationships $0 \leq a<1$, $0 \leq b<1$, $0<c<3$, $0<d<1$, $0 \leq e<2$, and $0<2a+b+c+d+e<4$. However, at least one of a and b is not 0).

In the mercaptosilane compound represented by general formula (2) above, $R^3$, $R^4$, and $R^5$ are each independently hydrogen, an alkyl group having from 1 to 8 carbon atoms, an alkoxy group having from 1 to 8 carbon atoms, a linear polyether group having a chain length of from 4 to 30, or an aryl group having from 6 to 30 carbon atoms, and preferably hydrogen, an alkyl group having from 1 to 8 carbon atoms, an alkoxy group having from 1 to 3 carbon atoms, or a linear polyether group having a chain length of from 10 to 29. The linear polyether group is preferably represented by the formula $—O—(R^{13}—O)p-R^{14}$. In the polyether portion $(R^{13}—O)p$, $R^{13}$ is an alkylene group having from 2 to 4 carbon atoms, and preferably an ethylene group, a trimethylene group ($—CH_2CH_2CH_2—$), or a propylene group. $R^{13}$ may be a single type or a plurality of types. p is the average value of the number of repetitions of the ether portion, and is a number from 2 to 15, preferably from 3 to 10, and more preferably from 3.5 to 8. $R^{14}$ is an alkyl group having from 10 to 16 carbon atoms, and preferably from 11 to 15 carbon atoms. The alkyl polyether group may be a plurality of types of mixtures, and examples of which include $—O—(CH_2CH_2—O)_5—(CH_2)_{10}CH_3$, $—O—(CH_2CH_2—O)_5—(CH_2)_{11}CH_3$, $—O—(CH_2CH_2—O)_5—(CH_2)_{12}CH_3$, $—O—(CH_2CH_2—O)_5—(CH_2)_{13}CH_3$, $—O—(CH_2CH_2—O)_5—$ $(CH_2)_{14}CH_3$, $-O-(CH_2CH_2-O)_3-(CH_2)_{12}CH_3$, $-O-(CH_2CH_2-O)_4-(CH_2)_{12}CH_3$, $-O-(CH_2CH_2-O)_6-(CH_2)_{12}CH_3$, and $-O-(CH_2CH_2-O)_7-(CH_2)_{12}CH_3$.

Among $R^3$, $R^4$, and $R^5$ in formula (2), at least one is an alkoxy group having from 1 to 8 carbon atoms, at least one is a linear polyether group having a chain length of from 4 to 30, and the mercaptosilane compound represented by formula (2) necessarily has an alkoxy group and a linear polyether group.

Furthermore, $R^6$ is an alkylene group having from 1 to 30 carbon atoms, and preferably an alkylene group having from 1 to 12 carbon atoms.

Examples of mercaptosilane compounds represented by general formula (2) above that are suitably used in the present invention include
$[C_{11}H_{23}O(CH_2CH_2O)_5](CH_2CH_2O)_2Si(CH_2)_3SH$,
$[C_{12}H_{25}O(CH_2CH_2O)_5](CH_2CH_2O)_2Si(CH_2)_3SH$,
$[C_{12}H_{25}O(CH_2CH_2O)_4](CH_2CH_2O)_2Si(CH_2)_3SH$,
$[C_{12}H_{25}O(CH_2CH_2O)_5](CH_2CH_2O)_2Si(CH_2)_3SH$,
$[C_{12}H_{25}O(CH_2CH_2O)_6](CH_2CH_2O)_2Si(CH_2)_3SH$,
$[C_{13}H_{27}O(CH_2CH_2O)_3](CH_2CH_2O)_2Si(CH_2)_3SH$,
$[C_{13}H_{27}O(CH_2CH_2O)_4](CH_2CH_2O)_2Si(CH_2)_3SH$,
$[C_{13}H_{23}O(CH_2CH_2O)_5](CH_2CH_2O)_2Si(CH_2)_3SH$,
$[C_{13}H_{27}O(CH_2CH_2O)_6](CH_2CH_2O)_2Si(CH_2)_3SH$,
$[C_{14}H_{29}O(CH_2CH_2O)_3](CH_2CH_2O)_2Si(CH_2)_3SH$,
$[C_{14}H_{29}O(CH_2CH_2O)_4](CH_2CH_2O)_2Si(CH_2)_3SH$,
$[C_{14}H_{29}O(CH_2CH_2O)_5](CH_2CH_2O)_2Si(CH_2)_3SH$,
$[C_{14}H_{29}O(CH_2CH_2O)_6](CH_2CH_2O)_2Si(CH_2)_3SH$,
$[C_{15}H_{31}O(CH_2CH_2O)_5](CH_2CH_2O)_2Si(CH_2)_3SH$,
$[C_{11}H_{23}O(CH_2CH_2O)_3]_2(CH_2CH_2O)_2Si(CH_2)_3SH$,
$[C_{12}H_{25}O(CH_2CH_2O)_5]_2(CH_2CH_2O)_2Si(CH_2)_3SH$,
$[C_{12}H_{25}O(CH_2CH_2O)_4]_2(CH_2CH_2O)_2Si(CH_2)_3SH$,
$[C_{12}H_{25}O(CH_2CH_2O)_5]_2(CH_2CH_2O)_2Si(CH_2)_3SH$,
$[C_{12}H_{25}O(CH_2CH_2O)_6]_2(CH_2CH_2O)_2Si(CH_2)_3SH$,
$[C_{13}H_{27}O(CH_2CH_2O)_3]_2(CH_2CH_2O)_2Si(CH_2)_3SH$,
$[C_{13}H_{27}O(CH_2CH_2O)_4]_2(CH_2CH_2O)_2Si(CH_2)_3SH$,
$[C_{13}H_{27}O(CH_2CH_2O)_5]_2(CH_2CH_2O)_2Si(CH_2)_3SH$,
$[C_{13}H_{27}O(CH_2CH_2O)_6]_2(CH_2CH_2O)_2Si(CH_2)_3SH$,
$[C_{14}H_{29}O(CH_2CH_2O)_3]_2(CH_2CH_2O)_2Si(CH_2)_3SH$,
$[C_{14}H_{29}O(CH_2CH_2O)_4]_2(CH_2CH_2O)_2Si(CH_2)_3SH$,
$[C_{14}H_{29}O(CH_2CH_2O)_5]_2(CH_2CH_2O)_2Si(CH_2)_3SH$,
$[C_{14}H_{29}O(CH_2CH_2O)_6]_2(CH_2CH_2O)_2Si(CH_2)_3SH$, and
$[C_{15}H_{31}O(CH_2CH_2O)_5]_2(CH_2CH_2O)_2Si(CH_2)_3SH$. Of these,
$[C_{13}H_{27}O-(CH_2CH_2O)_5]_2(CH_2CH_2O)Si(CH_2)_3SH$ and
$[C_{13}H_{27}O-(CH_2CH_2O)_5](CH_2CH_2O)_2Si(CH_2)_3SH$ are preferable.

In the mercaptosilane compounds having segments represented by the above general formulas (3) and (4) above, $R^7$ and $R^8$ may form a ring structure, and $R^9$ and $R^{19}$ may form a ring structure. $R^7$ and $R^9$ are selected from hydrogen, halogen, alkyl groups or alkylene groups having from 1 to 30 carbon atoms, alkenyl groups or alkenylene groups having from 2 to 30 carbon atoms, alkynyl groups or alkynylene groups having from 2 to 30 carbon atoms, and groups in which a terminal of the above alkyl groups or alkenyl groups is substituted with a hydroxyl group or a carboxyl group. The above alkyl groups, alkynyl groups, alkynylene groups, alkylene groups, alkenylene groups, and alkynylene groups each may be either branched or unbranched.

$R^8$ and $R^{10}$ are selected from alkylene groups having from 1 to 30 carbon atoms, alkenylene groups having from 2 to 30 carbon atoms, and alkynylene groups having from 2 to 30 carbon atoms. The above alkylene groups, alkenylene groups, and alkynylene groups each may be either branched or unbranched.

The content of segments represented by the above general formula (3) is preferably from 20 to 99 mol %, and more preferably from 30 to 95 mol %. When the content of segments of formula (3) is less than 20 mol %, it is difficult to balance low rolling resistance, wet performance, and wear resistance. Furthermore, when the content of segments of formula (3) exceeds 99 mol %, chemical bonding between the rubber and silica via the silane compound does not fully occur, and low rolling resistance, wet performance, and wear resistance are deteriorated.

The content of segments represented by the above general formula (4) is preferably from 1 to 80 mol %, and more preferably from 5 to 70 mol %. When the content of segments represented by formula (4) is less than 1 mol %, chemical bonding between the rubber and silica via the silane compound does not fully occur, and low rolling resistance, wet performance, and wear resistance are deteriorated. When the content of segments represented by formula (4) exceeds 80 mol %, it is difficult to balance processability with low rolling resistance, wet performance, and wear resistance.

The mercaptosilane compound having the average composition formula represented by the above general formula (5) has a siloxane backbone as its backbone. The siloxane backbone may be either a linear, branched, or three-dimensional structure, or a combination thereof.

In the above general formula (5), at least one of a and b is not 0. That is, at least one of a and b is greater than 0, and both a and b may be greater than 0. Thus, this polysiloxane necessarily contains at least one selected from a bivalent organic group A containing a sulfide group and a monovalent hydrocarbon group B having from 5 to 10 carbon atoms.

When the silane compound comprising the polysiloxane having the average composition formula represented by the above general formula (5) contains the monovalent hydrocarbon group B having from 5 to 10 carbon atoms, the mercapto groups are protected and the Mooney scorch time becomes longer, and at the same time, processability is excellent due to outstanding affinity with the rubber. For this reason, it is preferable for the subscript b of the hydrocarbon group B in general formula (5) to satisfy $0.10 \le b \le 0.89$. Specific examples of the hydrocarbon group B include monovalent hydrocarbon groups having preferably from 6 to 10 carbon atoms, and more preferably from 8 to 10 carbon atoms, such as a hexyl group, an octyl group, and a decyl group. As a result, it is possible to achieve better processability by protecting the mercapto groups and increasing the Mooney scorch time and to achieve better wet characteristics, wear resistance, and low rolling resistance.

When the silane compound comprising the polysiloxane having the average composition formula represented by the above general formula (5) contains the bivalent organic group A containing a sulfide group, wet performance, wear resistance, and processability (especially sustenance and prolongation of Mooney scorch time) are further improved. For this reason, it is preferable that the subscript a of the bivalent organic group A containing a sulfide group in general formula (5) satisfy $0 < a \le 0.50$.

The bivalent organic group A containing a sulfide group may be, for example, a hydrocarbon group optionally having a hetero atom such as an oxygen atom, nitrogen atom, or sulfur atom.

The sulfide group-containing organic group A is preferably a group represented by general formula (6) below from the perspective of enhancing the silica dispersibility and achieving better processability.

[Chemical Formula 5]

$$*-(CH_2)_n-S_x-(CH_2)_n-* \quad (6)$$

In the above general formula (6), n denotes an integer from 1 to 10, among which an integer from 2 to 4 is preferred. Also, x denotes an integer from 1 to 6, among which an integer from 2 to 4 is preferred. Furthermore, * indicates a bond position.

Specific examples of groups represented by general formula (6) above include $*-CH_2-S_2-CH_2-*$, $*-C_2H_4-S_2-C_2H_4-*$, $*-C_3H_6-S_2-C_3H_6-*$, $*-C_4H_8-S_2-C_4H_8-*$, $*-CH_2-S_4-CH_2-*$, $*-C_2H_4-S_4-C_2H_4-*$, $*-C_3H_6-S_4-C_3H_6-*$, and $*-C_4H_8-S_4-C_4H_8-*$.

The silane compound comprising polysiloxane having the average composition formula represented by the above general formula (5) has excellent affinity and/or reactivity with silica due to having a hydrolyzable group C. The subscript c of the hydrolyzable group C in general formula (5) preferably satisfies $1.2 \leq c \leq 2.0$ in that the wet characteristics and processability are excellent, the silica dispersibility is superior, and the low rolling resistance is excellent. Specific examples of the hydrolyzable group C include an alkoxy group, a phenoxy group, a carboxyl group, and an alkenyloxy group. The hydrolyzable group C is preferably a group represented by general formula (7) below from the perspective of enhancing the silica dispersibility and achieving better processability.

[Chemical Formula 6]

$$*-OR^{12} \quad (7)$$

In the above general formula (7), * denotes a bond position. Furthermore, $R^{12}$ denotes an alkyl group having from 1 to 20 carbon atoms, an aryl group having from 6 to 10 carbon atoms, an aralkyl group (aryl-alkyl group) having from 6 to 10 carbon atoms, or an alkenyl group having from 2 to 10 carbon atoms, among which an alkyl group having from 1 to 5 carbon atoms is preferable.

Specific examples of the alkyl group having from 1 to 20 carbon atoms include a methyl group, an ethyl group, a propyl group, a butyl group, a hexyl group, an octyl group, a decyl group, and an octadecyl group. Specific examples of the aryl group having from 6 to 10 carbon atoms include a phenyl group and a tolyl group. Specific examples of the aralkyl group having from 6 to 10 carbon atoms include a benzyl group and a phenylethyl group. Specific examples of the above alkenyl group having from 2 to 10 carbon atoms include a vinyl group, a propenyl group, and a pentenyl group.

The silane compound comprising polysiloxane having the average composition formula represented by the above general formula (5), due to having an organic group D containing a mercapto group, has interaction and/or reactivity with diene rubber, and has excellent wet performance and wear resistance. It is preferable for the subscript d of the organic group D containing a mercapto group to satisfy $0.1 \leq d \leq 0.8$. The organic group D containing a mercapto group is preferably a group represented by general formula (8) below from the perspective of enhancing the silica dispersibility and achieving better processability.

[Chemical Formula 7]

$$*-(CH_2)_m-SH \quad (8)$$

In the above general formula (8), m denotes an integer from 1 to 10, among which an integer from 1 to 5 is preferred. In the formula, * indicates a bond position.

Specific examples of groups represented by general formula (8) above include $*-CH_2SH$, $*-C_2H_4SH$, $*-C_3H_6SH$, $*-C_4H_8SH$, $*-C_5H_{10}SH$, $*-C_6H_{12}SH$, $*-C_7H_{14}SH$, $*-C_8H_{16}SH$, $*-C_9H_{18}SH$, and $*-C_{10}H_{20}SH$.

In the above general formula (5), $R^{11}$ denotes a monovalent hydrocarbon group having from 1 to 4 carbon atoms. Examples of the hydrocarbon group $R^{11}$ include a methyl group, an ethyl group, a propyl group, and a butyl group.

In the above general formula (5), a to e satisfy the relationships $0 \leq a < 1$, $0 \leq b < 1$, $0 < c < 3$, $0 < d < 1$, $0 \leq e < 2$, and $0 < 2a+b+c+d+e < 4$. However, at least one of a and b is not 0. Here, at least one of a and b not being 0 means that when $a=0$, $0<b$, and when $b=0$, $0<a$. Note that both $0<a$ and $0<b$ are possible.

In addition, in the rubber composition for a tire of the present invention, the size R of aggregates forming a hierarchical structure can be easily adjusted to 14 to 23 nm by blending an alkylsilane.

The alkylsilane is preferably an alkyltriethoxysilane having an alkyl group having from 7 to 20 carbon atoms. Examples of the alkyl group having from 7 to 20 carbon atoms include a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group. Among these, from the perspective of miscibility with the diene rubber, an alkyl group having from 8 to 10 carbon atoms is preferable, and an octyl group and a nonyl group are even more preferable.

The compounded amount of the alkylsilane is preferably from 1 to 20 wt % and more preferably from 2 to 15 wt % relative to the weight of the silica.

In addition, the size $R_{ss}$ of aggregates forming a hierarchical structure can be adjusted to 14 to 23 nm by adjusting the kneading conditions of the rubber composition. For example, the conditions for kneading the silica into the diene rubber are preferably such that kneading is performed at a temperature of from 120 to 170° C. and more preferably from 130 to 160° C. when blending the mercaptosilane and that kneading is performed for from 1 to 15 minutes and more preferably from 2 to 10 minutes after this temperature is reached. By using such kneading conditions, the size $R_{ss}$ of aggregates forming a hierarchical structure can be adjusted to 14 to 23 nm even when the compounded amount of the silica is large.

On the other hand, the size $R_{ss}$ of aggregates of the silica forming a hierarchical structure can be set to 14 to 23 nm even in a rubber composition in which a sulfur-containing silane coupling agent not having a mercapto group is blended instead of a mercaptosilane. The kneading conditions of the rubber composition at this time are preferably such that kneading is performed at a temperature of from 150 to 175° C. and more preferably from 155 to 170° C. and that kneading is performed for from 2 to 15 minutes and more preferably from 3 to 10 minutes after this temperature is reached. This makes it possible to set the size R of aggregates of the silica forming a hierarchical structure c to 14 to 23 nm.

The rubber composition for a tire of the present invention contains a diene rubber as a rubber component. Examples of the diene rubber include natural rubber, isoprene rubber, butadiene rubber, styrene-butadiene rubber, acrylonitrile butadiene rubber, butyl rubber, ethylene-α-olefin rubber, and chloroprene rubber. Of these, styrene-butadiene rubber, butadiene rubber, and natural rubber are preferable.

The composition more preferably contains a modified diene rubber in which a terminal of the polymer is modified with a functional group. Examples of the functional group of the modified diene rubber include functional groups having at least one type of atom selected from a group of atoms consisting of a nitrogen atom, an oxygen atom, and a silicon atom. Preferable examples of such functional group include a hydroxy group, an alkoxysilyl group, a silicon-containing group having siloxane bonds, an aminosilyl group, an epoxy group, and an amino group. One type of these functional groups may be used alone, or a plurality of types may be used in combination.

In addition, the content of the modified diene rubber is preferably not less than 20 parts by weight, more preferably from 30 to 100 parts by weight, and even more preferably from 50 to 100 parts by weight per 100 parts by weight of the diene rubber. By blending not less than 10 parts by weight of a modified diene rubber, it becomes easy to adjust the size R of aggregates forming a hierarchical structure to 14 to 23 nm.

Examples of the modified diene rubber include styrene-butadiene rubbers having a hydroxy group, an alkoxysilyl group, and/or a silicon-containing group having a siloxane bond. The backbone of the modified styrene-butadiene rubber preferably has an isoprene segment at one terminal thereof. Further, the functional group of the modified styrene-butadiene rubber is preferably a functional group derived from a compound which reacts with the silanol group on the silica surface. The compound which reacts with the silanol group is not particularly limited, but examples thereof include polyorganosiloxane compounds, epoxy compounds, hydrocarbyloxy silicon compounds, tin compounds, silicon compounds, silane compounds, amide compounds and/or imide compounds, isocyanate and/or isothiocyanate compounds, ketone compounds, ester compounds, vinyl compounds, oxirane compounds, thiirane compounds, oxetane compounds, polysulfide compounds, polysiloxane compounds, polyether compounds, polyene compounds, halogen compounds, and compounds having fullerenes. Among these, polyorganosiloxane, epoxy compounds, hydrocarbyloxy silicon compounds, and compounds are preferable.

The polyorganosiloxane compound is preferably polyorganosiloxane represented by one of the general formulas (9) to (11) below.

[Chemical Formula 8]

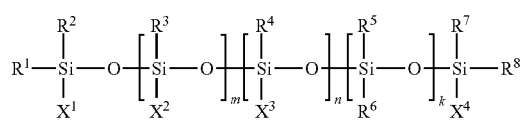

(9)

(In formula (9), $R^1$ to $R^8$ are alkyl groups having from 1 to 6 carbon atoms or aryl groups having from 6 to 12 carbon atoms, and $R^1$ to $R^8$ may be the same or different. $X^1$ and $X^4$ are groups having a functional group that reacts with the terminal of a conjugated diene polymer chain, alkyl groups having from 1 to 6 carbon atoms, or aryl groups having from 6 to 12 carbon atoms, and $X^1$ and $X^4$ may be the same or different. $X^2$ is a group having a functional group that reacts with the terminal of the conjugated diene polymer chain. $X^3$ is a group including from 2 to 20 repeating alkylene glycol units, and a portion of the $X_3$ may be a group derived from a group including from 2 to 20 repeating alkylene glycol units. m is an integer from 3 to 200, n is an integer from 0 to 200, and k is an integer from 0 to 200.)

[Chemical Formula 9]

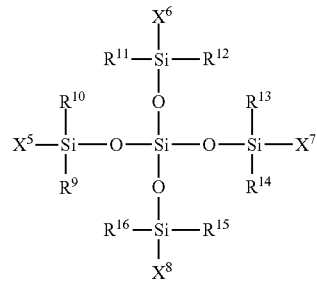

(10)

(In formula (10), $R^9$ to $R^{16}$ are alkyl groups having from 1 to 6 carbon atoms or aryl groups having from 6 to 12 carbon atoms, and $R^9$ to $R^{16}$ may be the same or different. $X^5$ to $X^8$ are groups having a functional group that reacts with the terminal of the conjugated diene polymer chain.)

[Chemical Formula 10]

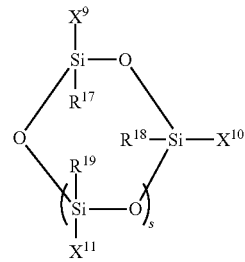

(11)

(In formula (11), $R^{17}$ to $R^{19}$ are alkyl groups having from 1 to 6 carbon atoms or aryl groups having from 6 to 12 carbon atoms, and $R^{17}$ to $R^{19}$ may be the same or different. $X^9$ to $X^{11}$ are groups having a functional group that reacts with the terminal of the conjugated diene polymer chain. s is an integer from 1 to 18.)

In formulas (9) to (11), alkoxy groups having from 1 to 5 carbon atoms, hydrocarbon groups containing 2-pyrrolidonyl groups, and hydrocarbon groups with from 4 to 12 carbon atoms containing epoxy groups are preferable as the groups having a functional groups that reacts with the terminal of the polymer chain represented by $X^2$ to $X^{11}$.

In the present invention, other compounding agents may be added in addition to those described above. Examples of the other compounding agents include various compounding agents commonly used in rubber compositions for tires such as reinforcing fillers excluding silica, vulcanization or cross-linking agents, vulcanization accelerators, antiaging agents, liquid polymers, thermosetting resins, and thermoplastic resins. These compounding agents can be blended in typical amounts conventionally used so long as the objects of the present invention are not hindered. An ordinary rubber kneading machine such as a Banbury mixer, a kneader, or a roller can be used as the kneader.

Examples of the other reinforcing filler include carbon black, clay, mica, talc, calcium carbonate, aluminum hydroxide, aluminum oxide, and titanium oxide. Of these, carbon black is preferable, whereby the hardness, strength, and wear resistance of the rubber composition can be enhanced. The compounded amount of the carbon black is preferably from 3 to 15 parts by weight and more preferably from 4 to 10 parts by weight per 100 parts by weight of the diene rubber.

The present invention is further described below using Working Examples. However, the scope of the present invention is not limited to these Working Examples.

EXAMPLES

Components excluding sulfur and a vulcanization accelerator of each of 22 types of rubber compositions for a tire containing compounding agents shown in Table 3 as common components and comprising each composition shown in Tables 1 and 2 (Working Examples 1 to 15, Standard Example, and Comparative Examples 1 to 7) were kneaded with a 1.7 L sealed Banbury mixer. After the respective "mixing temperatures" shown in Tables 1 and 2 were reached, the compositions were each kneaded while adjusting the revolution speed of the mixer so as to maintain the temperature during the "keep time" shown in Tables 1 and 2. A master batch was thus produced. After a prescribed amount of time passed, the composition was discharged from the mixer and cooled at room temperature. Sulfur and the vulcanization accelerator were added to the cooled master batch and mixed with a 1.7 L sealed Banbury mixer to prepare each of the rubber compositions for a tire. Note that in the rows of Styrene butadiene rubber (SBR1, SBR2) in Table 1, the net compounded amount, excluding the amount of the oil-extending component, of SBR is written in parentheses in addition to the compounded amount of the product. Furthermore, the compounded amounts of the compounding agents shown in Table 2 are expressed in part by weight per 100 parts by weight of the diene rubbers shown in Table 1.

The obtained 22 types of rubber compositions were each press-vulcanized at 160° C. for 30 minutes in a predetermined mold to produce test pieces formed from each of the rubber compositions for a tire. The size $R_{ss}$ of aggregates forming a hierarchical structure in the obtained test pieces was evaluated in accordance with the following method.

Size $R_{ss}$ of Aggregates Forming a Hierarchical Structure

A vulcanized rubber sheet having a thickness of 0.5 mm was produced as described above and measured by ultra-small-angle X-ray scattering (USAXS) at 100° C. The measurement conditions of ultra-small-angle X-ray scattering (USAXS) were such that measurements were performed with a wave number q of from 0.006 to 0.4 nm$^{-1}$ (q=4π/λ sin θ; θ: scattering angle; λ: 0.62 Angstrom (X-ray energy: 20 keV); exposure time: 488 msec; camera length: 7.6 m). $R_{ss}$ was calculated by finding the circular average of −90 to 180° to transform the resulting scattering image into a single dimension and performing fitting using general formula (I) above for the scattering profile. The obtained results are shown in the "Size $R_{ss}$ of aggregates" rows of Tables 1 and 2.

Pneumatic tires of size (195/65R15) for testing in which the 22 types of rubber compositions that were obtained were used as cap treads were vulcanization-molded. Using each test tire, the wet performance and rolling resistance were evaluated in accordance with the methods described below.

Wet Grip Performance

Each test tire was mounted on all of the wheels of a vehicle (FF2000 cc, manufactured in Japan), and the braking distance from an initial speed of 100 km/h was found on a wet asphalt road surface. The results are expressed as index values, wherein greater numerical values indicate superior wet skid performance (wet grip performance). The index values were determined by the following formula.

(Wet grip performance)=(braking distance of Comparative Example 1)/(braking distance of each formulation)×100

The obtained results are shown in the "Wet grip performance" rows of Tables 1 to 2. A larger value indicates superior wet performance.

Rolling Resistance

Each test tire was mounted on a rim (15×6JJ) and filled to a standard air pressure prescribed by JATMA. The tire was placed on an indoor drum tester (drum diameter: 1707 mm) prescribed by JIS D4230, and the resistance at a test load of 2.94 kN and a speed of 50 km/hr was measured and used as the rolling resistance. The obtained results are shown in the "Rolling resistance" rows of Table 1 as an index with the value of Comparative Example 1 being defined as 100. Smaller values indicate lower rolling resistance and superior fuel consumption performance

TABLE 1

| | | | Comparative Example 1 | Comparative Example 2 | Comparative Example 3 |
|---|---|---|---|---|---|
| SBR1 | | Part by weight | | 137.5 (100) | 137.5 (100) |
| SBR2 | | Part by weight | 137.5 (100) | | |
| Silica 1 | | Part by weight | | | |
| Silica 2 | | Part by weight | | 90 | 60 |
| Silica 3 | | Part by weight | 90 | | |
| Coupling agent 1 | | Part by weight | | 7.2 | 4.8 |
| Coupling agent 2 | | Part by weight | 7.2 | | |
| Coupling agent 3 | | Part by weight | | | |
| Alkylsilane | | Part by weight | 2.7 | | |
| Kneading conditions | Mixing temperature | ° C. | 110 | 145 | 145 |
| | Keep time | Seconds | 180 | 120 | 120 |
| Size $R_{ss}$ of aggregates | | nm | 25 | 28 | 23 |
| Wet grip performance | | Index value | 100 | 101 | 89 |
| Rolling resistance | | Index value | 100 | 110 | 93 |

TABLE 1-continued

|  |  | Comparative Example 4 | Comparative Example 5 | Comparative Example 6 |
|---|---|---|---|---|
| SBR1 | Part by weight | 137.5 (100) | 137.5 (100) |  |
| SBR2 | Part by weight |  |  | 137.5 (100) |
| Silica 1 | Part by weight | 90 | 90 |  |
| Silica 2 | Part by weight |  |  |  |
| Silica 3 | Part by weight |  |  | 90 |
| Coupling agent 1 | Part by weight | 7.2 | 7.2 | 7.2 |
| Coupling agent 2 | Part by weight |  |  |  |
| Coupling agent 3 | Part by weight |  |  |  |
| Alkylsilane | Part by weight |  |  | 2.7 |
| Kneading conditions  Mixing temperature | °C. | 145 | 170 | 130 |
| Keep time | Seconds | 120 | 180 | 120 |
| Size $R_{ss}$ of aggregates | nm | 23 | 22 | 26 |
| Wet grip performance | Index value | 91 | 93 | 103 |
| Rolling resistance | Index value | 93 | 91 | 103 |

|  |  | Comparative Example 7 | Working Example 1 | Working Example 2 | Working Example 3 | Working Example 4 |
|---|---|---|---|---|---|---|
| SBR1 | Part by weight |  | 137.5 (100) |  |  |  |
| SBR2 | Part by weight | 137.5 (100) |  | 137.5 (100) | 137.5 (100) | 137.5 (100) |
| Silica 1 | Part by weight |  |  |  |  |  |
| Silica 2 | Part by weight |  | 90 | 90 |  |  |
| Silica 3 | Part by weight | 200 |  |  | 90 | 90 |
| Coupling agent 1 | Part by weight |  | 7.2 | 7.2 | 7.2 | 7.2 |
| Coupling agent 2 | Part by weight |  |  |  |  |  |
| Coupling agent 3 | Part by weight | 16.0 |  |  |  |  |
| Alkylsilane | Part by weight | 2.7 |  |  |  | 2.7 |
| Kneading conditions  Mixing temperature | °C. | 150 | 170 | 170 | 170 | 155 |
| Keep time | Seconds | 120 | 180 | 180 | 180 | 180 |
| Size $R_{ss}$ of aggregates | nm | 26 | 23 | 22 | 23 | 23 |
| Wet grip performance | Index value | 131 | 104 | 107 | 110 | 111 |
| Rolling resistance | Index value | 103 | 93 | 91 | 93 | 93 |

TABLE 2

|  |  | Working Example 5 | Working Example 6 | Working Example 7 | Working Example 8 |
|---|---|---|---|---|---|
| SBR1 | Part by weight | 137.5 (100) | 137.5 (100) | 137.5 (100) | 137.5 (100) |
| SBR2 | Part by weight |  |  |  |  |
| Silica 2 | Part by weight | 90 | 90 | 90 | 90 |
| Silica 3 | Part by weight |  |  |  |  |
| Silica 4 | Part by weight |  |  |  |  |
| Coupling agent 2 | Part by weight |  |  |  | 7.2 |
| Coupling agent 3 | Part by weight | 7.2 | 7.2 | 7.2 |  |
| Coupling agent 4 | Part by weight |  |  |  |  |
| Alkylsilane | Part by weight |  |  |  |  |
| Kneading conditions  Mixing temperature | °C. | 130 | 150 | 130 |  |
| Keep time | Seconds | 120 | 120 | 120 |  |
| Size $R_{ss}$ of aggregates | nm | 21 | 20 | 18 | 22 |
| Wet grip performance | Index value | 105 | 107 | 110 | 104 |
| Rolling resistance | Index value | 88 | 86 | 83 | 91 |

|  |  | Working Example 9 | Working Example 10 | Working Example 11 | Working Example 12 |
|---|---|---|---|---|---|
| SBR1 | Part by weight | 137.5 (100) | 137.5 (100) | 137.5 (100) | 96.25 (70) |
| SBR2 | Part by weight |  |  |  | 41.25 (30) |
| Silica 2 | Part by weight | 90 |  |  |  |
| Silica 3 | Part by weight |  | 90 | 90 | 90 |
| Silica 4 | Part by weight |  |  |  |  |

TABLE 2-continued

|  |  |  |  |  |  |
|---|---|---|---|---|---|
| Coupling agent 2 | Part by weight |  |  |  |  |
| Coupling agent 3 | Part by weight |  |  |  |  |
| Coupling agent 4 | Part by weight | 7.2 | 7.2 | 7.2 | 7.2 |
| Alkylsilane | Part by weight |  |  | 2.7 | 2.7 |
| Kneading conditions Mixing temperature | °C. | 130 | 130 | 130 |  |
| Keep time | Seconds | 120 | 120 | 120 |  |
| Size $R_{ss}$ of aggregates | nm | 20 | 21 | 20 | 19 |
| Wet grip performance | Index value | 107 | 110 | 112 | 113 |
| Rolling resistance | Index value | 86 | 88 | 86 | 83 |

|  |  | Working Example 13 | Working Example 14 | Working Example 15 |
|---|---|---|---|---|
| SBR1 | Part by weight | 96.25 (70) | 96.25 (70) | 96.25 (70) |
| SBR2 | Part by weight | 41.25 (30) | 41.25 (30) | 41.25 (30) |
| Silica 2 | Part by weight |  |  |  |
| Silica 3 | Part by weight | 90 |  | 150 |
| Silica 4 | Part by weight |  | 90 |  |
| Coupling agent 2 | Part by weight |  |  |  |
| Coupling agent 3 | Part by weight |  |  |  |
| Coupling agent 4 | Part by weight | 7.2 | 7.2 | 12 |
| Alkylsilane | Part by weight | 2.7 | 2.7 | 2.7 |
| Kneading conditions Mixing temperature | °C. | 150 | 150 | 150 |
| Keep time | Seconds | 120 | 120 | 120 |
| Size $R_{ss}$ of aggregates | nm | 18 | 20 | 22 |
| Wet grip performance | Index value | 116 | 118 | 126 |
| Rolling resistance | Index value | 80 | 86 | 91 |

The types of raw materials used as per Tables 1 and 2 are described below.
- SBR1: styrene-butadiene rubber, VSL 5025HM-1, manufactured by LANXESS; oil extended product containing 37.5 parts by weight of an oil-extending component per 100 parts by weight of styrene-butadiene rubber
- SBR2: modified styrene-butadiene rubber containing a hydroxy group, E581 manufactured by Asahi Kasei Corporation; oil extended product containing 37.5 parts by weight of an oil-extending component per 100 parts by weight of styrene-butadiene rubber
- Silica 1: silica, Zeosil 1115MP, manufactured by Solvay; nitrogen adsorption specific surface area: 115 m²/g
- Silica 2: silica, Zeosil 1165MP, manufactured by Solvay; nitrogen adsorption specific surface area: 165 m²/g
- Silica 3: silica, Zeosil 200MP, manufactured by Solvay; nitrogen adsorption specific surface area: 210 m²/g
- Silica 4: silica, Hisil EZ200G, manufactured by PPG Industries, Ltd.; nitrogen adsorption specific surface area: 300 m²/g
- Coupling agent 1: sulfur-containing silane coupling agent, bis(3-triethoxysilylpropyl)tetrasulfide; Si69 manufactured by Evonik Industries AG
- Coupling agent 2: mercaptosilane, KBE-803 manufactured by Shin-Etsu Chemical Co., Ltd.
- Coupling agent 3: mercaptosilane, VPSi363 manufactured by Evonik Industries AG
- Coupling agent 4: polysiloxane synthesized in accordance with the production method described below
- Alkylsilane: Octyltriethoxysilane, KBE-3083, manufactured by Shin-Etsu Chemical Co., Ltd.

Production Method for Coupling Agent 4

107.8 g (0.2 mol) of bis(triethoxysilylpropyl)tetrasulfide (KBE-846, manufactured by Shin-Etsu Chemical Co., Ltd.), 190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 190.0 g of ethanol were placed in a 2-L separable flask provided with an agitator, a reflux condenser, a dropping funnel and a thermometer, and then a mixed solution containing 37.8 g (2.1 mol) of 0.5 N hydrochloric acid and 75.6 g of ethanol was added dropwise at room temperature. It was then stirred for 2 hours at 80° C. Then, it was filtered, and 17.0 g of 5% KOH/EtOH solution was added dropwise, and the mixture was stirred for 2 hours at 80° C. Then, by vacuum concentration and filtration, 480.1 g of polysiloxane in the form of a brown transparent liquid was obtained. As a result of measurement by GPC, the average molecular weight was 840, and the average degree of polymerization was 4.0 (preset degree of polymerization: 4.0). In addition, as a result of measuring the mercapto equivalent weight by an acetic acid/potassium iodide/potassium iodate addition/sodium thiosulfate solution titration method, the equivalent weight was 730 g/mol, and it was thus confirmed that the preset mercapto group content was achieved. From the above, the obtained polysiloxane is represented by the following average compositional formula.

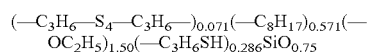

The obtained polysiloxane was used as coupling agent 4.

TABLE 3

Common components of the rubber compositions

| Stearic acid | 2.5 Parts by weight |
|---|---|
| Zinc oxide | 2.5 Parts by weight |
| Anti-aging agent | 1.0 Part by weight |
| Oil | 10.0 Parts by weight |
| Sulfur | 1.4 Parts by weight |
| Vulcanization accelerator 1 | 1.7 Parts by weight |
| Vulcanization accelerator 2 | 1.0 Parts by weight |

The types of raw materials used as indicated in Table 3 are shown below.

Stearic acid: Beads Stearic Acid YR, manufactured by NOF Corp.

Zinc oxide: Zinc Oxide #3, manufactured by Seido Chemical Industry Co., Ltd.

Anti-aging agent: Santoflex 6PPD, manufactured by Flexsys

Oil: Extract No. 4S, manufactured by Showa Shell Sekiyu K.K.

Sulfur: Golden Flower oil treated sulfur powder, manufactured by Tsurumi Chemical Industry Co., Ltd.

Vulcanization accelerator 1: CBS, NOCCELER CZ-G manufactured by Ouchi Shinko Chemical Industrial Co., Ltd.

Vulcanization accelerator 2: DPG, NOCCELER D manufactured by Ouchi Shinko Chemical Industrial Co., Ltd.

As clear from Tables 1 and 2, it was confirmed that the rubber compositions for a tire produced in Working Examples 1 to 15 demonstrated excellent low rolling resistance and wet grip performance.

Since the rubber composition of Comparative Example 1 was prepared by kneading a rubber composition containing a coupling agent 2 made of a mercaptosilane and a silica 3 at a low mixing temperature of 110° C., the size $R_{ss}$ of aggregates of the silica forming a hierarchical structure exceeded 23 nm, and it was not possible to enhance the rolling resistance.

Since the rubber composition of Comparative Example 2 was prepared by kneading a rubber composition containing a tetrasulfide-based silane coupling agent not containing a mercapto group at a low mixing temperature of 145° C., the size $R_{ss}$ of aggregates of the silica forming a hierarchical structure exceeded 23 nm, and the rolling resistance was deteriorated.

In the rubber composition of Comparative Example 3, the wet grip performance is insufficient since the compounded amount of silica 2 is less than 66 parts by weight.

In the rubber compositions of Comparative Examples 4 and 5, the wet grip performance is sufficient since the nitrogen adsorption specific surface area of silica 1 is less than 150 m²/g.

Since the rubber composition of Comparative Example 6 was prepared by kneading a rubber composition containing a tetrasulfide-based silane coupling agent not containing a mercapto group and silica 3 at a low mixing temperature of 130° C., the size $R_{ss}$ of aggregates of the silica forming a hierarchical structure exceeded 23 nm, and the rolling resistance was deteriorated.

In the rubber composition of Comparative Example 7, the compounded amount of silica 3 exceeds 160 parts by weight, so the size $R_{ss}$ of aggregates of the silica forming a hierarchical structure exceeds 23 nm, and the rolling resistance is therefore deteriorated.

REFERENCE SIGNS LIST

1 Tread portion
12 Tread rubber layer

The invention claimed is:

1. A rubber composition for a tire obtained by blending from 66 to 180 parts by weight of a silica having a nitrogen adsorption specific surface area of from 150 to 400 m²/g into 100 parts by weight of a diene rubber; a size $R_{ss}$ of aggregates of the silica forming a hierarchical structure being from 14 to 23 nm when the rubber composition is measured by ultra-small-angle X-ray scattering and an obtained scattering profile is applied to a Unified-Guinier function, wherein a mercaptosilane is blended in having the formula:

$$(A)_a(B)_b(C)_c(D)_d(R^{11})_e\text{SiO}_{(4-2a-b-c-d-e)/2} \quad (5)$$

wherein in the formula, A is a bivalent organic group containing a sulfide group; B is a monovalent hydrocarbon group having from 5 to 10 carbon atoms; C is a hydrolyzable group; D is an organic group containing a mercapto group; $R^{11}$ is a monovalent hydrocarbon group having from 1 to 4 carbon atoms; and a to e satisfy the relationships $0 \leq a < 1$, $0 \leq b < 1$, $0 < c < 3$, $0 < d < 1$, $0 \leq e < 2$, and $0 < 2a+b+c+d+e < 4$, and at least one of a and b is not 0.

2. The rubber composition for a tire according to claim 1 containing at least 20 wt. % of a modified diene rubber having a functional group having at least one type of atom selected from the group of atoms consisting of a nitrogen atom, an oxygen atom, and a silicon atom relative to 100% of the diene rubber.

3. The rubber composition for a tire according to claim 2, wherein the functional group is selected from a hydroxy group, an alkoxysilyl group, a silicon-containing group having a siloxane bond, an aminosilyl group, an epoxy group, and an amino group.

* * * * *